United States Patent
Stachowski et al.

(10) Patent No.: US 10,221,548 B2
(45) Date of Patent: Mar. 5, 2019

(54) INTEGRATED SINK AND DISPOSAL UNIT

(71) Applicant: MAG Aerospace Industries, LLC, Carson, CA (US)

(72) Inventors: Joerg Stachowski, San Pedro, CA (US); Razmik B. Boodaghians, Glendale, CA (US); Timothy Morse, Aliso Viejo, CA (US); Christina Ortolan, Long Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 12 days.

(21) Appl. No.: 15/200,373

(22) Filed: Jul. 1, 2016

(65) Prior Publication Data

US 2017/0009438 A1    Jan. 12, 2017

Related U.S. Application Data (60) Provisional application No. 62/290,141, filed on Feb. 2, 2016, provisional application No. 62/192,853, filed (Continued)

(51) Int. Cl.
  *E03C 1/00* (2006.01)
  *E03C 1/18* (2006.01)
(Continued)

(52) U.S. Cl.
  CPC .............. *E03C 1/18* (2013.01); *B64D 11/02* (2013.01); *B64D 11/04* (2013.01); *E03C 1/23* (2013.01); *E03F 1/006* (2013.01)

(58) Field of Classification Search
  CPC .. E03C 1/18; E03C 1/23; B64D 11/02; B64D 11/04

(Continued)

(56) References Cited

U.S. PATENT DOCUMENTS 6,012,678 A * 1/2000 Hale .................. B64D 11/02
                                                244/118.5
6,223,361 B1    5/2001 Rozenblatt
(Continued)

FOREIGN PATENT DOCUMENTS

EP    2690015    1/2014
WO    2017/007710    1/2017

OTHER PUBLICATIONS

International Patent Application No. PCT/US2016/040675, Search Report and Written Opinion dated Sep. 13, 2016.

(Continued)

*Primary Examiner* — Huyen Le
(74) *Attorney, Agent, or Firm* — Kilpatrick Townsend & Stockton LLP; Dean W. Russell; Kristin M. Crall (57) ABSTRACT

Embodiments of the present invention provide systems and methods for disposal of liquid and food into a sink basin. The disclosed system cooperates with and delivers the received waste material to the main waste system on-board the vehicle. This is typically an aircraft waste tank. The system does not require a manual flush, but includes a sensor system that activates drainage of the holding line when the liquid and/or other waste material reaches a certain level therein. The disclosed system combines the functionalities of a common galley sink and a galley waste disposal unit, but occupies only the space envelope of an existing galley sink. The use of an existing galley sink means that no additional space on the countertop is required.

6 Claims, 8 Drawing Sheets

Related U.S. Application Data on Jul. 15, 2015, provisional application No. 62/189,576, filed on Jul. 7, 2015.

(51) Int. Cl.
  *B64D 11/02* (2006.01)
  *B64D 11/04* (2006.01)
  *E03C 1/23* (2006.01)
  *E03F 1/00* (2006.01)

(58) Field of Classification Search
  USPC .......................................................... 4/653
  See application file for complete search history.

(56) References Cited

U.S. PATENT DOCUMENTS

| | | |
|---|---|---|
| 6,385,789 B1 | 5/2002 | Pondelick et al. |
| 6,393,635 B2 | 5/2002 | Rozenblatt |
| 7,533,426 B2 | 5/2009 | Pondelick |
| 8,011,033 B2 | 9/2011 | Wierenga |
| 8,185,983 B2 | 5/2012 | Wierenga |
| 9,448,563 B2 * | 9/2016 | Goeschel ............... E03C 1/242 |
| 2002/0112281 A1 * | 8/2002 | Erdmann ............... B64D 11/02 4/321 |
| 2006/0225200 A1 | 10/2006 | Wierenga |
| 2008/0201832 A1 | 8/2008 | Seibt |
| 2016/0159482 A1 | 6/2016 | Burd |
| 2017/0297718 A1 | 10/2017 | Boodgahians et al. |
| 2018/0038088 A1 | 2/2018 | Stachowski et al. |

OTHER PUBLICATIONS

International Patent Application No. PCT/US2016/040675, International Preliminary Report on Patentability dated Jan. 18, 2018.
U.S. Appl. No. 15/785,581, Office Action (Restriction Requirement) dated Mar. 19, 2018.

* cited by examiner

INTEGRATED SINK AND DISPOSAL UNIT

CROSS REFERENCE TO RELATED APPLICATIONS

This application claims the benefit of U.S. Provisional Application Ser. No. 62/189,576, filed Jul. 7, 2015, titled "Amalgamated Compact Water and Food Disposal Unit for Managing Waste Products on Board Aircraft," U.S. Provisional Application Ser. No. 62/192,853, filed Jul. 15, 2015, titled "Amalgamated Compact Water and Food Disposal Unit for Managing Waste Products on Board Aircraft Part II," and U.S. Provisional Application Ser. No. 62/290,141, filed Feb. 2, 2016, titled "GEMini Description Single Stage," the entire contents of each of which are hereby incorporated by reference.

FIELD OF THE DISCLOSURE

Embodiments of the present disclosure relate generally to systems and methods for draining solid, liquid, and slurry food waste into a galley sink and its delivery to a waste system, rather than to a drain mast. The disclosed embodiments may be used to retrofit existing sink units, such that an entire disposal system or new sink footprint is not required.

BACKGROUND

In passenger transportation environments, it is often necessary to dispose of unwanted fluids and slurries/small solids. Most commercial aircraft and other passenger transportation vehicles are equipped with galley and lavatory sinks, however, these sinks are primarily intended for the disposal of liquid waste only. It is often the case that these sinks terminate at the drain mast of the aircraft (or other vehicle) for exhaustion of the liquids to the atmosphere. This presents multiple challenges. First, when the liquids to be disposed of are dark and potentially staining, such as wine, coffee, and so forth, expelling the liquids to the outside of the aircraft can cause the liquids to "paint" the aircraft sides. This can result in an unsightly streak, staining the aircraft and potentially damaging a "clean aircraft" image and leading to increased maintenance/cleaning cost on the ground. Another problem is that disposing of many liquids to the atmosphere is not environmentally friendly. A further problem is that the lines leading between the sink drain and the drain mast are often small in diameter and if any food particles or slurry material is poured into the sink, it can lead to clogging of the drain line. (Most solids are disposed of in a trash compactor or other waste compartment, but there may be instances where small solids, particles, or granules are combined with liquids to be disposed, and it is desirable to pour unseparated slurry or viscous-like liquids into a sink.) However, traditional sink systems are limited in their ability to dispose of more viscous liquid or particulate waste products.

Some attempted solutions include providing a vacuum galley waste disposal system. These disposal systems function much like an aircraft vacuum toilet. Not only can they dispose of liquid, but they can also flush solid waste. Current systems, however, require an entire disposal system to be installed. They do not use the existing sink space in the galley. Instead, they occupy valuable countertop space inside the galleys. Galley disposal systems also generally include a lid to help reduce sound generated by the vacuum flush. They are manually activated by the user depressing a flush switch or button located near the sink. They also create a somewhat loud flushing sound, which can be a nuisance to passengers seated near the galley. These systems are also similar to toilets in that they typically have a rinse valve/rinse ring incorporated into the basin and require additional fresh water to operate properly.

Improvements to liquid and food disposal in passenger transportation vehicles, such as aircraft, are desired.

BRIEF SUMMARY

The present inventors have designed a system that allows for disposal of liquid and food into a sink basin. For example, the liquid may be mixed with food particles, granules, or other small solid materials. If desired, a sink strainer may be provided to prevent large solid pieces from entering the disposal system disclosed, but is not required. The disclosed system cooperates with and delivers the received waste material to the waste system on-board the vehicle. This is typically an aircraft waste tank. The system does not require a manual flush, but includes a sensor system that activates drainage of the holding line when the liquid and/or other waste material reaches a certain level therein. The disclosed system combines the functionalities of a common galley sink and a galley waste disposal unit, but occupies only the space envelope of an existing galley sink. The use of an existing galley sink means that no additional space on the countertop is required. The open sink can be also used for draining of dripping equipment, such as the galley spigot.

In some examples, there is provided an integrated sink system, comprising: a standard sink basin; a vent/holding line having a generally constant diameter along its length; a conduit between the standard sink basin and the vent/holding line, wherein the conduit joins with the vent/holding line at a joint; at least one level sensor; and a flush valve positioned below the joint. The level sensor can be positioned above the joint. When installed on an aircraft, the vent/holding line, the at least one level sensor, and the flush valve are mounted behind the aircraft galley monument. It is also possible for the components to be mounted within the galley monument or a combination of behind and within.

In other examples, there is provided a vent/holding line, comprising: a generally constant diameter along a tube length; a connection joint where the vent/holding line cooperates with a conduit from a sink basin; at least one level sensor positioned above the connection joint; and a flush valve positioned below the joint.

A further example provides an integrated sink system for an aircraft galley, comprising: a standard sink basin; a transition pipe connecting the standard skin basin with a reservoir, the transition pipe routed along a rear wall of the aircraft galley; the reservoir comprising a vent line, a level sensor, and first and second flush valves, the first flush valve positioned at an upper portion of the reservoir, the second flush valve positioned at a lower portion of the reservoir.

DETAILED DESCRIPTION

Figure 1:
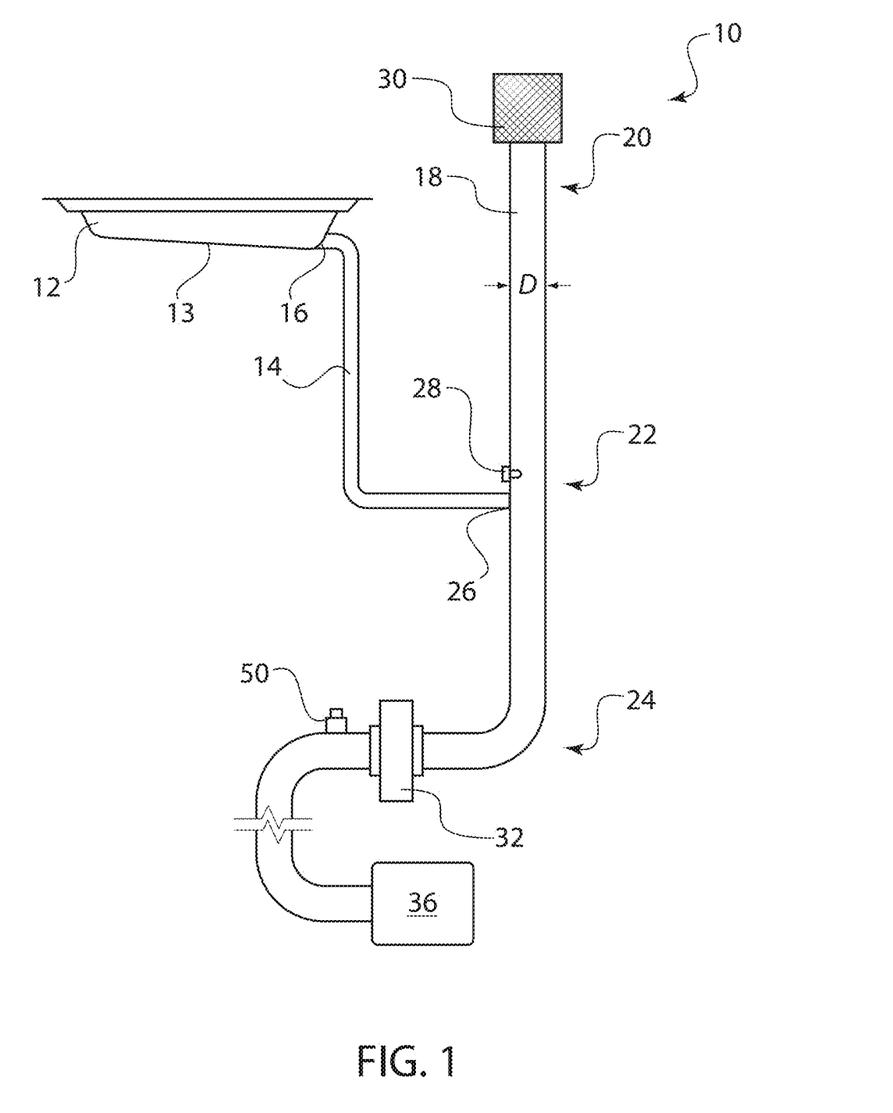
FIG. 1 shows a side plan view of one example of an integrated sink/disposal unit.

FIG. 1 illustrates one embodiment of an integrated sink system 10. This system 10 amalgamates traditional galley sink functions (receiving liquid) with disposal functions (receiving food and other types of slurry or waste). One advantage of the systems described herein is that they may be used to retrofit an existing galley sink without removing the galley sink itself. These systems do not require a specialized disposal sink, such as those having rinse valves and/or air inlet ports. Instead, a standard sink basin 12 is all that is required. Such a sink basin 12 may be the basin already installed (or scheduled for installation) in a galley. Although the system described herein finds particular use in galley sink configurations, it should be understood that they may find use in other sink configurations, such as lavatory sinks.

The term "standard sink basin" as used herein means a sink basin that has not been modified to have rinse valves, rinse ports, or air inlet ports. A standard sink basin may be a metallic and/or composite bowl having a drain port 16. A standard sink basin may have an angled lower surface 13 that guides waste contents poured therein toward the drain port 16. A standard sink basin may be any basin that is currently installed in the galley, and/or a sink basin that was originally designed only to receive liquid waste.

Extending from the standard sink basin 12 is a conduit 14. In some examples, the conduit 14 may be a standard sink drain line. In other examples, the conduit 14 may be a flexible drain line. If made of a flexible material, the conduit may be silicone. The conduit 14 may have any appropriate dimensions, depending upon aircraft specifications. In one example, the conduit may be ¾ inches in diameter. In another example, the conduit may be 1 inch in diameter. And further examples, the conduit may be 1.5 inches in diameter. Of course, other diameter options are possible and considered within the scope of this disclosure.

Figure 2A:
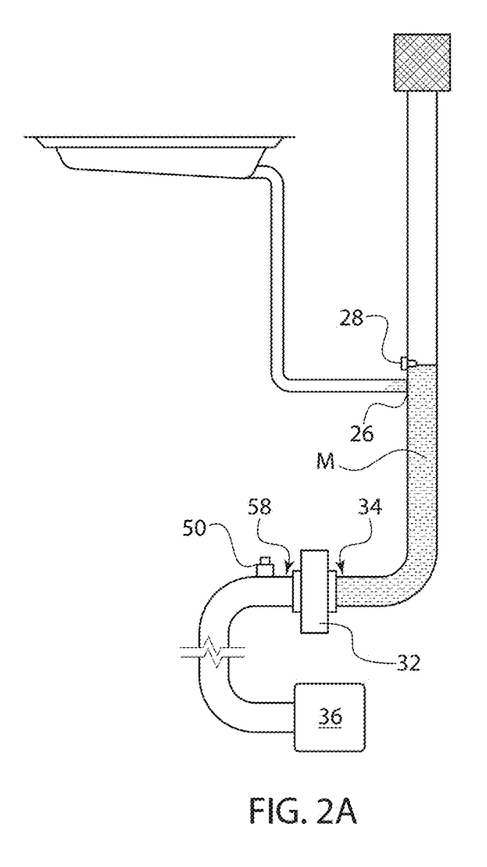
FIG. 2A shows the unit of FIG. 1 with material in the vent/holding line.

The conduit 14 is in fluid communication with the sink drain 16 and with a vent/holding line 18. In use, material leaving the sink basin 12 drains via gravity through the conduit 14 into the vent/holding line 18. FIG. 1 illustrates vent/holding line 18. FIG. 2 illustrates vent/holding line 18 with material "M" therein, after having been poured into the sink basin. In the illustrations shown, the vent/holding line 18 has a constant diameter "D" throughout the length of the line. For example, the diameter D at an upper portion 20 of the line is the same diameter as a mid portion 22 and a lower 24 portion of the line. For example, the constant diameter D may be about ¾ inches up to 3 inches. In one specific example, the constant diameter D may be about 2 inches. In other examples, the constant diameter D may be about ¾ inches, 1 inch, 1.5 inches, 2¼ inches, 2.5 inches, or 3 inches. Of course, other diameter options are possible and considered within the scope of this disclosure, and depend primarily upon aircraft specifications and requirements.

The vent/holding line 18 may be made of a titanium material, a composite material, combinations thereof, or any other appropriate material. The vent/holding line 18 may be coated internally with antimicrobial coating or other treatment in order to reduce microbial growth and/or to prevent odors.

The conduit 14 joins the vent/holding line 18 at joint 26. Joint 26 is illustrated as being a right angle between the conduit 14 and the line 18 in FIG. 2A. Joint 26 is illustrated as being a Y-shaped, V-shaped, or as otherwise having an acute angle between the conduit 14 and the line 18 in FIG. 2B. It should be understood that other joining angles are possible and considered within the scope of this disclosure.

In use, the vent/holding line 18 functions as a temporary reservoir, but is not shaped differently than a vent line. The vent/holding line 18 features a level sensor 28 positioned above the joint 26. The level sensor 28 may be an intrusive level sensor, such that it contacts the liquid or other material to be sensed. Alternatively, the level sensor 28 may be a non-intrusive sensor. The level sensor 28 may be an optical sensor. The level sensor 28 may be a conductive sensor. The level sensor 28 may be a capacitive sensor. The level sensor 28 may be a float sensor. The level sensor 28 may be an ultrasonic sensor. The level sensor 28 may be a pressure sensor. Other types of sensors are possible and considered within the scope of this disclosure. The general goal of the sensor 28 is to alert a controller when liquid, slurry, or other material reaches the height of the level sensor 28 in order to trigger a flush. Providing the level sensor 28 positioned above the joint 26 helps prevent the level sensor 28 from being in constant contact with liquid and other waste material M.

The vent/holding line 18 also features an air silencer 30 or muffler at its upper end. This allows intake of air into the vent line, but also prevents a loud rush of air during the intake process. It is generally desirable for the air silencer 30 to be lightweight and to take up only a small envelope of space, if possible.

Below the joint 26 and along the vent/holding line 18 is a flush valve 32. Flush valve 32 may be a standard flush valve or a specialized flush valve, many of which are described in the current assignee's co-pending applications. Because specific features of the flush valve 32 are not critical to this disclosure, they will not be described further. In some examples, the flush valve 32 is a vacuum toilet flush valve. In some examples, the flush valve 32 uses leading-edge technology that minimizes buildup inside the flush valve. One of ordinary skill in the art would understand features of various types of flush valves 32 that may be used in accordance with this disclosure.

Figure 2B:
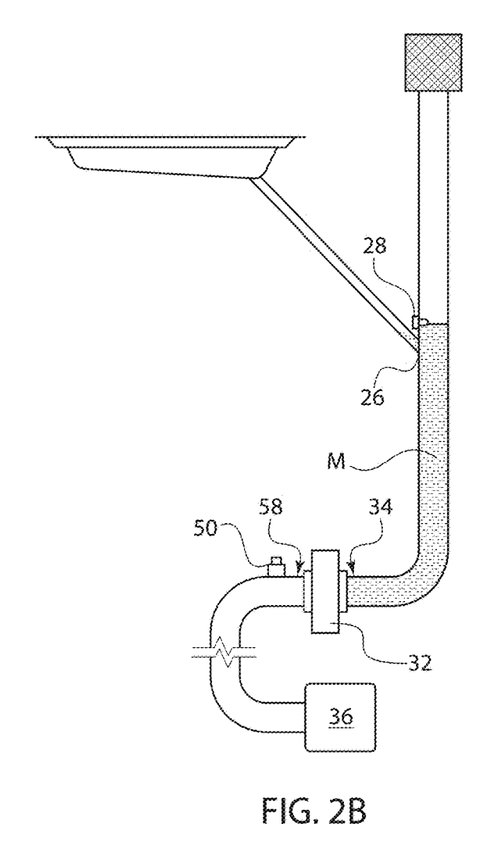
FIG. 2B shows an alternate unit having a Y-shaped connection joint.

In use, material poured into the sink basin 12 flows into the conduit 14 and down into the vent/holding line 18. The flush valve 32 is in a normally closed position. This causes the material M to accumulate in the vent/holding line 18 on the sink side 34 of the line 18, as shown by FIG. 2A. The angle of joint 26 and gravity may cause the material M to migrate slightly up the conduit 14 as well, as illustrated by FIG. 2B. In one example, the distance and diameter of the line 18 between the flush valve 32 and the level sensor 28 allows the line to hold approximately 1.5 liters of liquid and/or other waste material. Once the material M reaches the level sensor 28, the level sensor 28 indicates to a controller that sufficient material has accumulated in the line 18 such that a flush is necessary. (Although a manual flush valve may be provided, the general intent is that the system function like a standard sink, without requiring any action on the part of the user.) A controller checks to confirm that sufficient vacuum is available. For example, a vacuum sensor 50 may be present on the vacuum side 58 of the vent/holding line 18. If sufficient vacuum is not present, a vacuum generator may be started. (For example, if the aircraft is not in flight such that a pressure differential is not available, a vacuum generator may be used to create the vacuum for the flush process. Similarly, a vacuum generator may be used if the system is mounted on a land or water-based vehicle, rather than an aircraft.) Otherwise, the pressure differential between cabin pressure and outside pressure may be used to create vacuum.

Once the controller ensures that sufficient differential pressure/vacuum is available, the controller opens the flush valve 32, allowing the liquid/material to be transported to the vacuum waste tank 36. When the flush valve 32 opens, vacuum from the aircraft main waste tank 36 is applied to the vent/holding line 18. Exposure of the vent/holding line 18 to vacuum pulls the material M out of the vent/holding line 18 and into the waste tank 36. Once the flush is complete, the flush valve 32 is re-closed.

The fact that the level sensor 28 is positioned above the joint 26 helps quiet the flush process. The presence of a column of liquid/material helps reduce noise. Additionally, the presence of the venting air silencer 30 means that as the flush process begins, a small amount of air is drawn into the vent/holding line 18 to help reduce noise by preventing air from being drawn in through the sink basin 12. The time for the entire flush process to take place is barely noticeable to the user. As an example, the flush valve 32 may be open for approximately 1 to 4 seconds, then closed. In other examples, the flush valve 32 may be open for approximately 1 to 2 seconds. In further examples, the flush valve may be open for only a few seconds or less.

Figure 3:
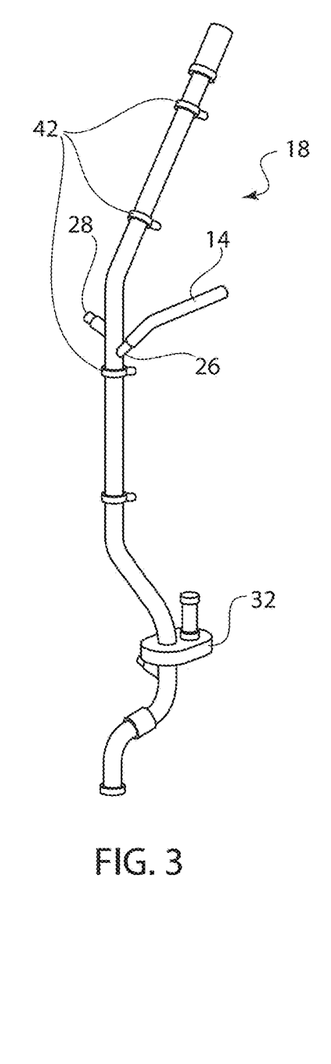
FIG. 3 shows a perspective view of one example of a vent/holding line feature.
Figure 4:
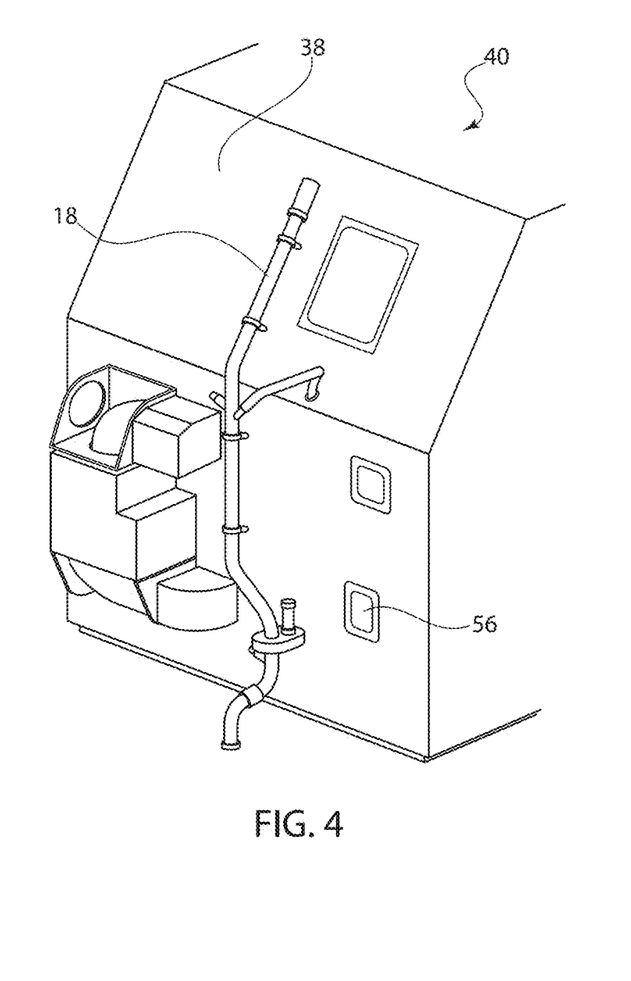
FIG. 4 shows the vent/holding line of FIG. 3 installed on a rear surface of the galley.

FIG. 3 illustrates the vent/holding line 18 external from the galley and the sink. FIG. 4 illustrates the vent/holding line 18 positioned along a rear surface 38 of a galley 40. One benefit of the disclosed system is that the flush valve 32 and other portions of the system need not be positioned directly in the galley itself or directly beneath the sink. Use of the conduit 14 may allow a standard sink basin 12 to be connected to the vent/holding line 18, when the line 18 is positioned a distance from the sink basin 12. FIGS. 3 and 4 illustrate securement features 42 which may be used to secure the vent/holding line 18 to the galley (or other structure) rear surface 38.

FIG. 3 illustrates the conduit 14 extending from the line 18 at joint 26. The conduit 14 may be any appropriate length. For example, it may be 1 to 2 feet. In other examples, its length may be even shorter. However, in other examples, conduit 14 may be many feet long in order to connect a standard sink basin 12 with a remote vent/holding line 18. The figures also illustrate the presence of the level sensor 28 above the joint 26. Although level sensor 28 is shown as positioned a few inches (or less than about a foot) above the joint 26, it should be understood that level sensor 28 may be positioned anywhere along the vent/holding line 18. It is generally preferred that the level sensor 28 be positioned above joint 26 in order to prevent the level sensor from being in contact with the material to be flushed for an extended period of time.

Figure 5:
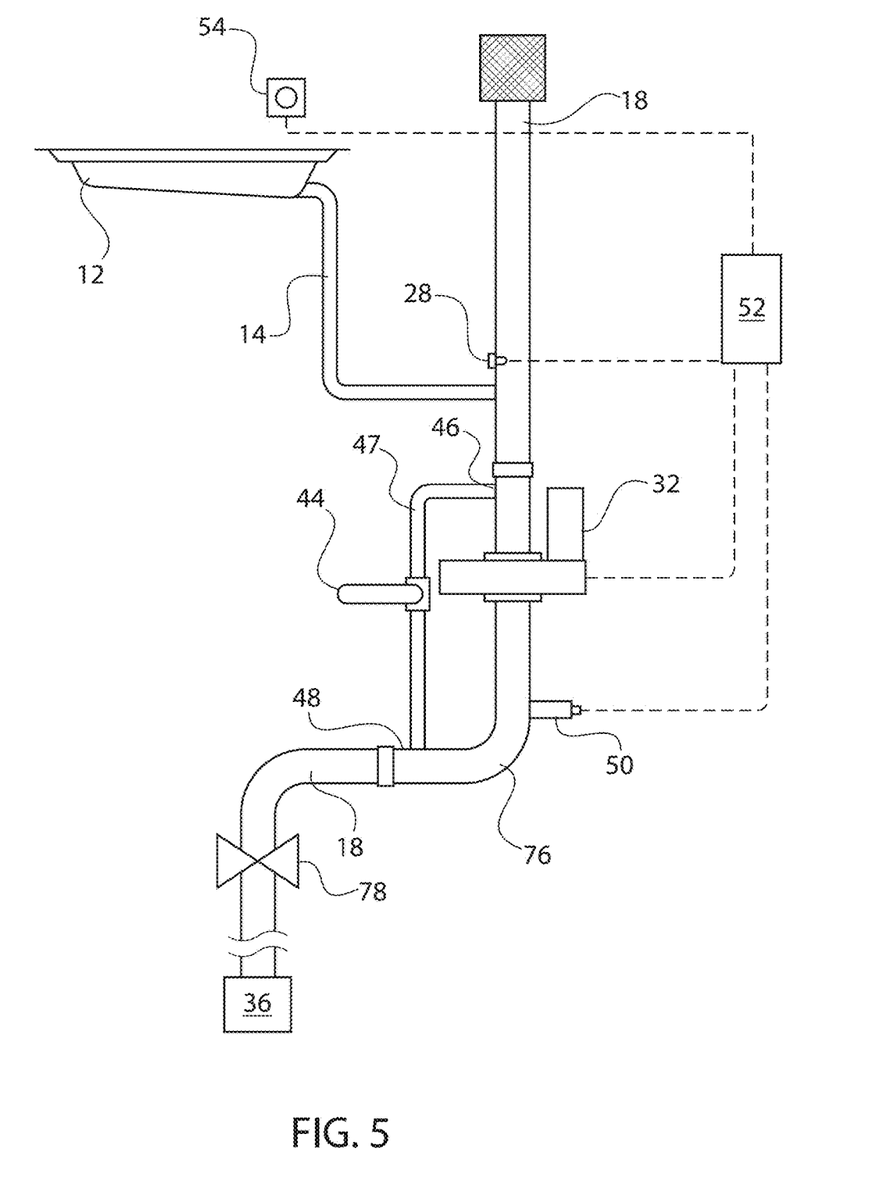
FIG. 5 shows a side view of one example of an integrated sink/disposal unit having a manual bypass valve.

FIG. 5 illustrates an embodiment having a manual bypass valve 44. The manual bypass valve 44 may be a spring-loaded valve, or any other appropriate valve. The manual bypass valve 44 has a first connection point 46 to the line 18 at a position above the flush valve 32. The manual bypass valve 44 has a second connection point 48 to the line 18 at a position below the flush valve 32. A vacuum sensor 50 is positioned between the flush valve 32 and the second connection point 48. In the unlikely event of failure of the flush valve 32 and/or loss of vacuum (as detected by the vacuum sensor 50), the manual bypass valve 44 may be activated in order to cause a manual flush. In this instance, material in the vent/holding line 18 is rerouted away from the flush valve 32 through the first connection 46, through the conduit 47, and back into the vent/holding line 18 via the second connection 48. Vacuum suction then pulls the material to the main waste tank. The manual bypass valve 44 may be activated by maintenance personnel or flight crew. It may be keyed or otherwise provided with a safety feature preventing tampering. As shown by FIG. 4, an access door 56 may be provided on a rear surface 38 of galley in order to allow access to portions of the system 10 (for either maintenance personnel or crew.) In the example shown, the manual bypass valve 44 and conduit 47 are positioned around an elbow 76 in the line 18.

In the event that the flush valve 32 fails in its open position and/or if the bypass valve 44 becomes stuck open, it is possible to provide an emergency shut-off valve 78. One example is illustrated by FIG. 5. As illustrated, the emergency shut-off valve 78 will generally be positioned downstream of the flush valve 32 and past the joint between conduit 47 and the line 18. The emergency shut-off valve 78 may work via a handle or other structure that can manually block application of vacuum from the waste tank 36 up through vent/holding line 18.

FIG. 5 also illustrates a controller 52, which is in communication with the level sensor 28, with an override flush switch 54, with the flush valve 32, and with the vacuum sensor 50. (Although shown on the embodiment with the manual bypass valve 44, it is possible for these features to be present on other embodiments disclosed herein.) If a user pours a great deal of material into the sink and wishes to activate a flush manually, the override flush switch 54 may be activated. Activation of the override flush switch 54 communicates to the controller 52 to open the flush valve 32, even if the level sensor 28 does not detect material. The override flush switch 54 may also be used in the event that the level sensor 28 fails. The user may simply activate a flush at will. A final "end of flight" flush may also be activated by the override flush switch 54. This can purge the lines and ensure that any liquid that may be present in the vent/holding line 18 that does not quite reach the height of the level sensor 28 is flushed prior to the aircraft being parked/stored. This can help prevent freezing of water in the line and/or prevent bacterial growth.

Figure 6:
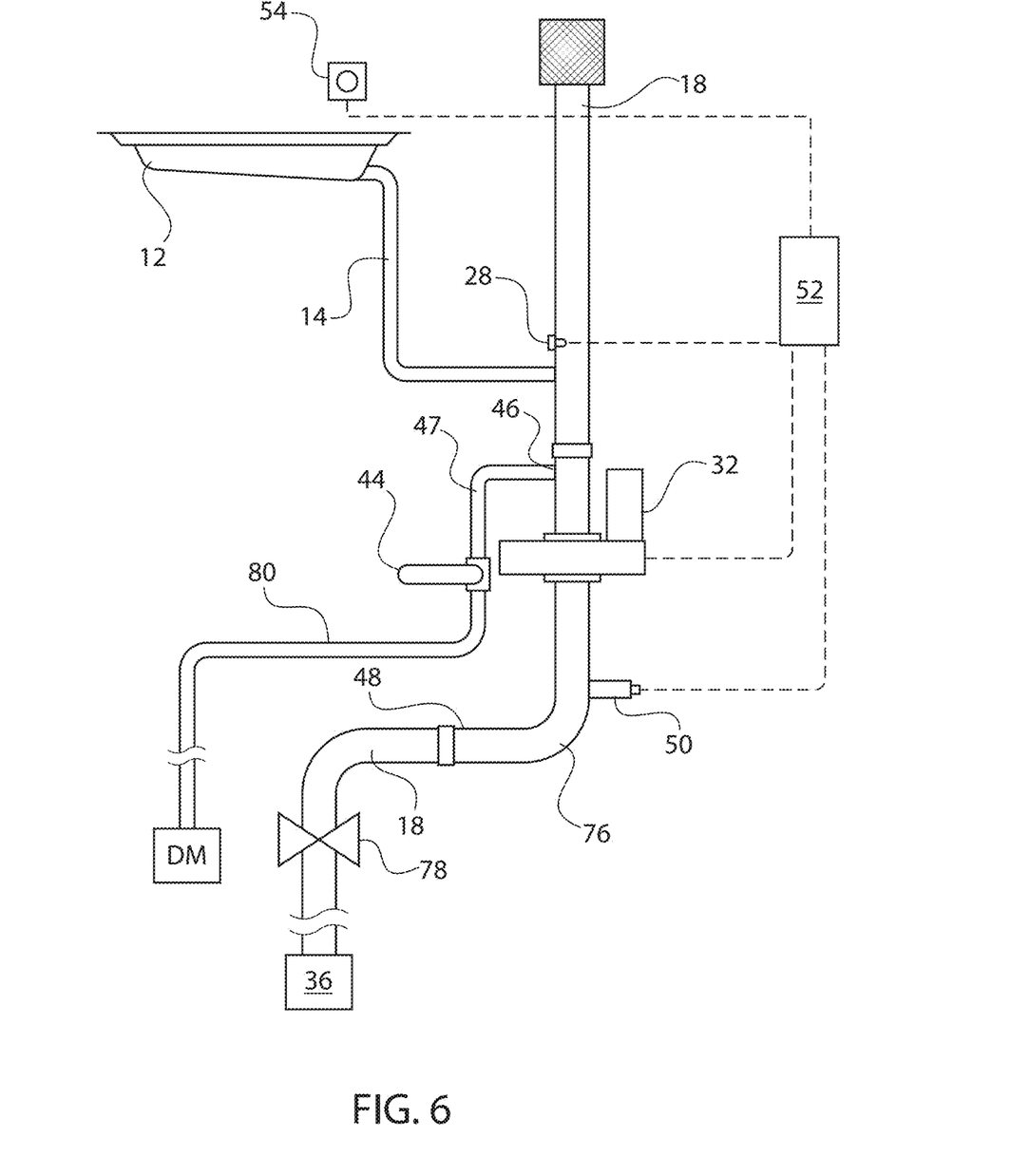
FIG. 6 shows a side view of one example of an integrated sink/disposal unit h having a bypass to the drain mast.

It is also possible to provide a waste tank override 80, which will direct the material in the vent/holding line 18 to the drain mast. As illustrated by FIG. 6, the waste tank override 80 may be positioned on or near the manual bypass valve 44. For example, it may be positioned along the same line. It is generally positioned before the flush valve 32, on the sink side of the line 18. However, in another example, it may be positioned after the flush valve, on the vacuum side of the line 18. In use, liquids passing through the system can be routed into tubing that directs fluid to the drain mast "DM."

Figure 7:
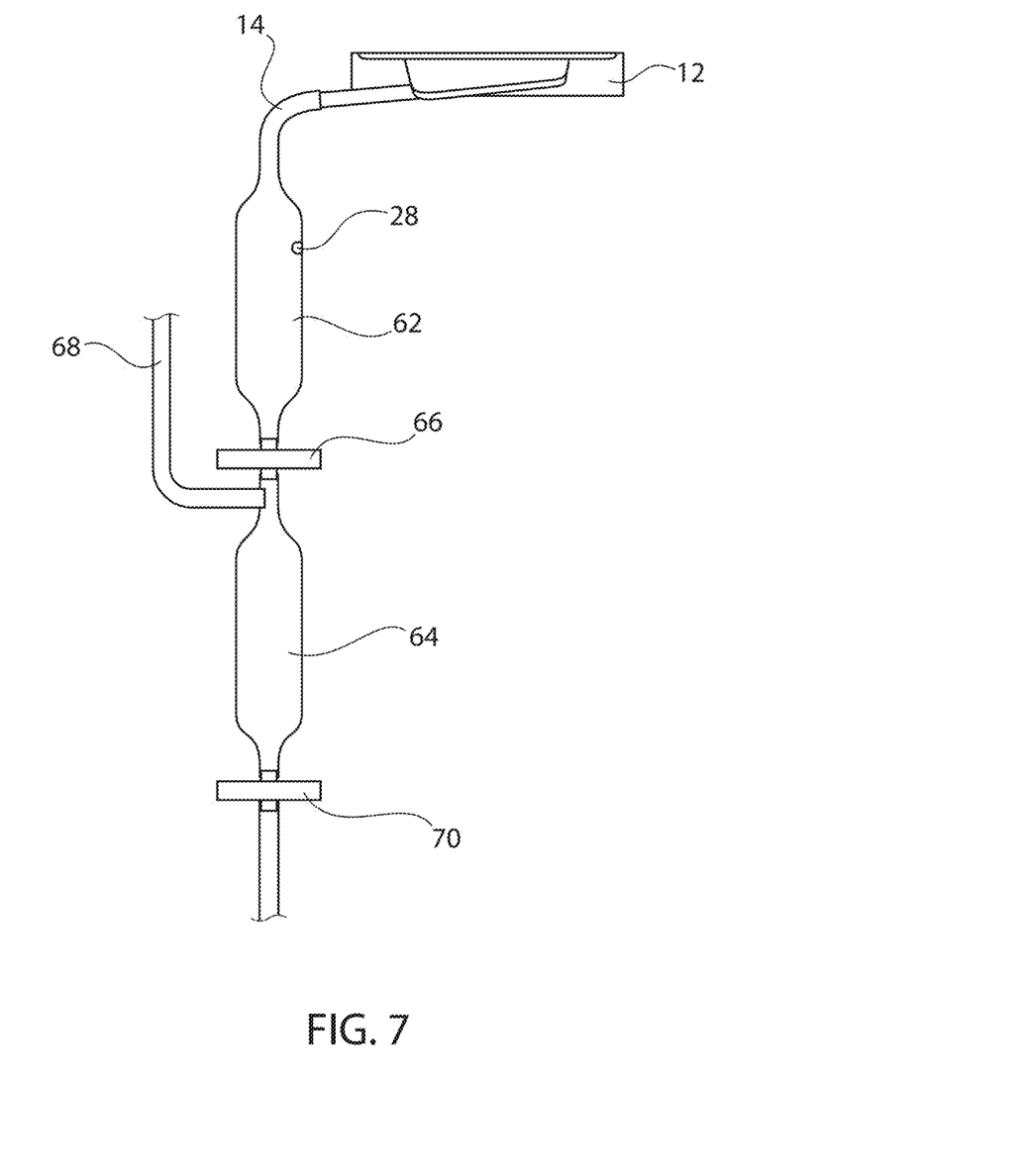
FIG. 7 shows a side plan view of an alternate embodiment disposal unit.

FIG. 7 illustrates an alternative embodiment of a sink system 60. In this example, a standard sink basin 12 may be used. The conduit 14 may be attached as described above.

This example, however provides first and second reservoirs 62, 64. The first reservoir 62 incorporates a level sensor 28. This example is illustrated by FIG. 7. In the alternate embodiment illustrated by FIGS. 7A and 7B, the level sensor 28 may be positioned in the second reservoir 64. In one example, the first reservoir 62 has a widened diameter, as illustrated. In other examples, the first reservoir 62 may function much like the vent/holding line described above, having a constant diameter. The second reservoir 64 is illustrated as having a diameter that is wider than a water line, but this is not required. Below the first reservoir 62 is a first flush valve 66. System 60 also has an air vent 68. In one example, air vent 68 extends from an upper portion of the second reservoir 64. At a lower portion of the second reservoir 64 is a second flush valve 70.

Figure 7A:
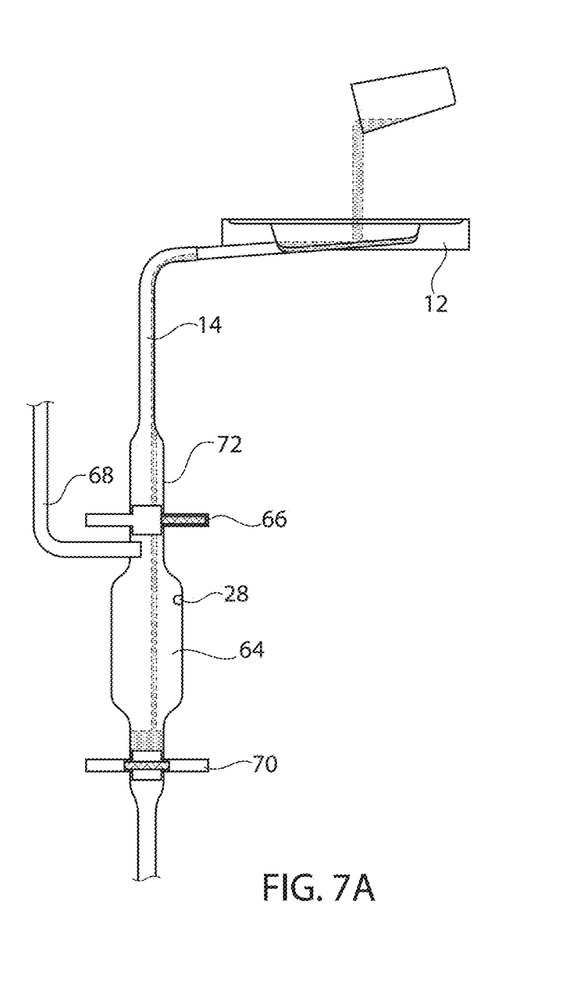
FIG. 7A shows the unit of FIG. 7, with the first flush valve open and the second flush valve closed, in a liquid receiving configuration.
Figure 7B:
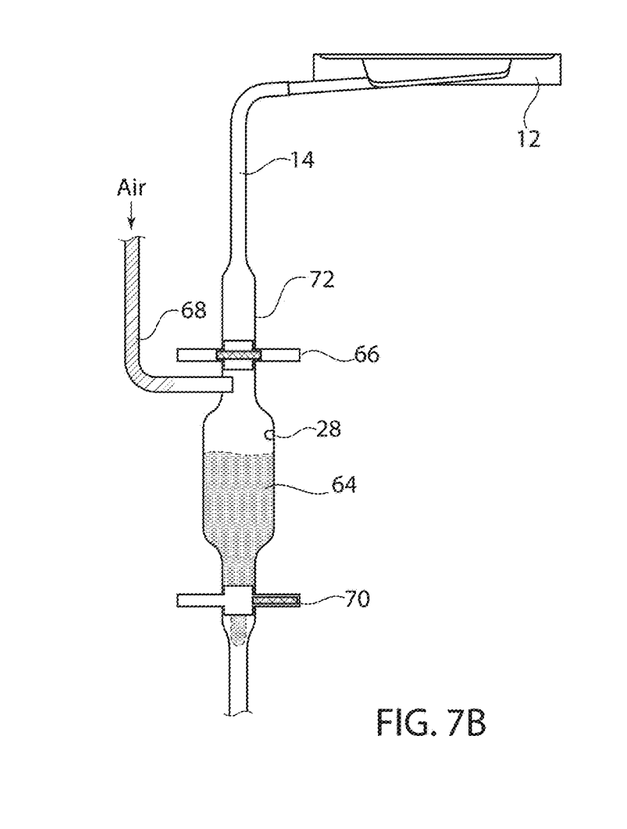
FIG. 7B shows the unit of FIG. 7, with the first flush valve closed and the second flush valve open, in a flushing configuration.

In initial use, flush valve 66 may be open and the flush valve 70 may be closed. One example is illustrated by FIG. 7A. A user pours liquid or other material into the standard sink basin 12. The liquid or other material travels past the first pipe portion 62, past the open flush valve 66, and rests in the second reservoir 64, on the sink side of the flush valve 70. Once the liquid reaches the height of the level sensor 28, a flush may be triggered. Triggering of the flush causes the first flush valve 66 to close and the second flush valve 70 to open. One example of this configuration is illustrated by FIG. 7B. External air is also pulled into the second reservoir 64 via the vent line 68. Once all liquid or other material has been evacuated from the second reservoir 64 by application of vacuum through the second flush valve 70, the second flush valve 70 closes and the first flush valve 66 is allowed to re-open.

Although FIG. 7 illustrates the first and second reservoirs 62, 64 as being widened portions of the tubing, it is possible for these reservoirs to have a constant diameter as described above. The holding ability of the reservoirs is determined based on a combination of the length and diameter of the tubing, which may be altered depending upon space and other requirements.

Figure 8:
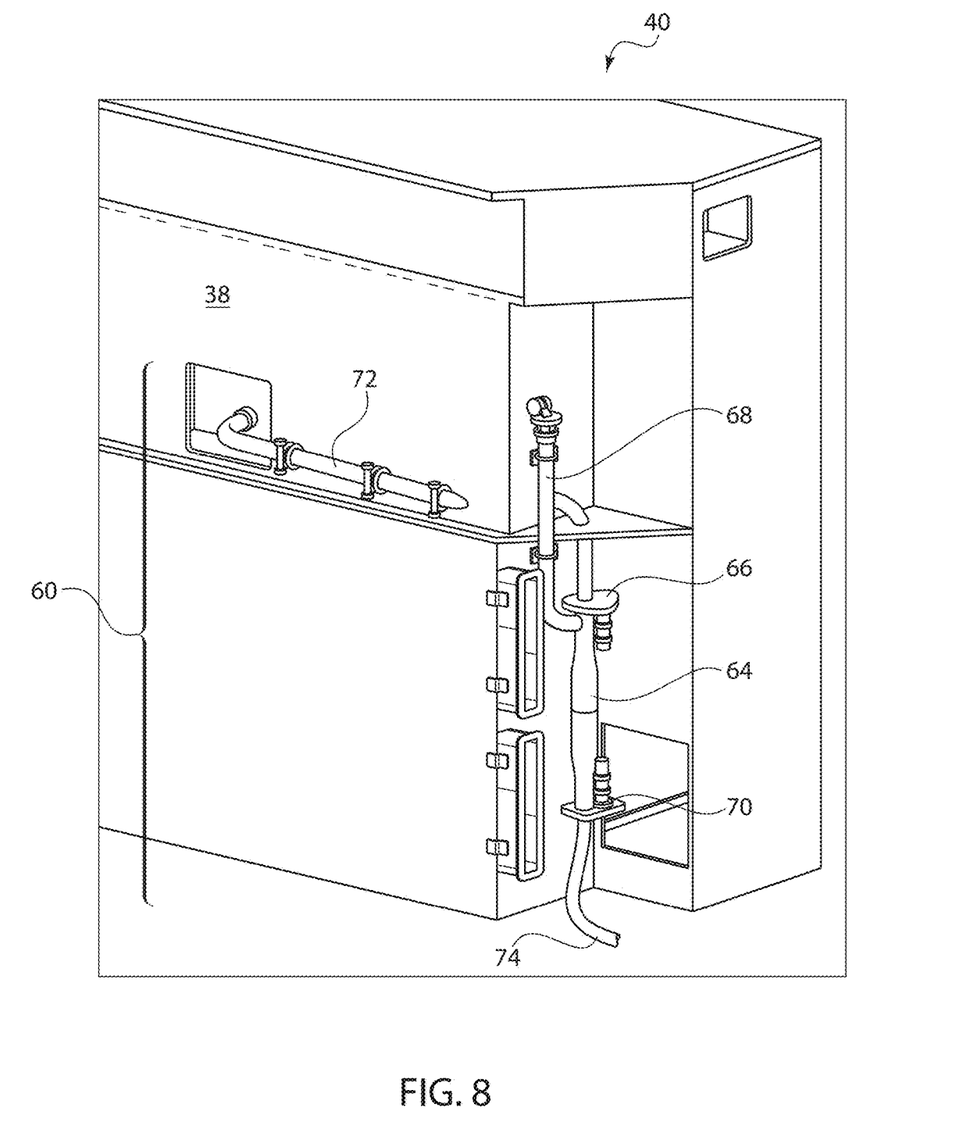
FIG. 8 shows a rear view of a galley having a disposal unit tubing installed.

FIG. 8 illustrates one example of sink system 60 positioned along a rear surface 38 of a galley monument 40. Installation along the rear surface generally means that the system is installed behind the galley monument, and not underneath the sink or cabinet area. In other examples, however, it is possible for the components described herein to be installed within the galley monument. In this example, the transport pipe 72 functions as the first reservoir. The air vent 68 is shown extending from the second reservoir 64. The second reservoir 64 is shown as having a slightly larger diameter than the first reservoir/transfer pipe 72, but this is not required. First flush valve 66 and second flush valve 70 are shown positioned with respect to the second reservoir 64. A connection 74 to the aircraft vacuum system is also illustrated.

The specific components used of any of the disclosed embodiments may be determined based on aircraft specifications. For example, the vacuum sensor used may be a current robust differential pressure switch used on other aircraft applications. The level sensing technology may be assured to provide reliable sensing under all possible conditions (including build-up on the reservoir walls). The controller may be a unit that controls the opening and closing of the flush valve based upon signals from the level sensor and vacuum switch. The vent/holding line may be manufactured from a lightweight high impact material. Non-limiting examples include composites and/or titanium. The conduit drain line 14 from the galley sink may be helical wound silicone hoses connected to the system with stainless steel hose clamps.

Changes and modifications, additions and deletions may be made to the structures and methods recited above and shown in the drawings without departing from the scope or spirit of the disclosure or the following claims.

What is claimed is:

1. An integrated sink system for an aircraft galley, comprising:
   a standard sink basin;
   a transition pipe connecting the standard sink basin with a reservoir, the transition pipe routed along a rear wall of the aircraft galley;
   the reservoir comprising a vent line, a level sensor, at least one flush valve positioned below the reservoir, and a bypass conduit comprising a manual bypass valve that bypasses the at least one flush valve, the bypass conduit comprising a first connection point above the flush valve and a second connection point below the flush valve.

2. The system of claim 1, wherein the system is installed or use in an aircraft galley monument, and wherein the vent line, the level sensor, and the at least one flush valve are mounted behind the aircraft galley monument.

3. The system of claim 1, wherein the system is installed for use in an aircraft galley monument, and wherein the vent line, the level sensor, and the at least one flush value are mounted within the aircraft gallery monument.

4. The system of claim 1, further comprising an air muffler at the upper end of the vent line.

5. The system of claim 1, wherein the level sensor comprises a capacitive sensor, an optical sensor, a conductive sensor, a float sensor, an ultrasonic sensor, a pressure sensor, or any combination thereof.

6. The system of claim 1, further comprising a vacuum sensor.

* * * * *